United States Patent

Marsic

[11] Patent Number: 6,039,162
[45] Date of Patent: Mar. 21, 2000

[54] CLUTCH RETAINING DEVICE

[75] Inventor: Martin D. Marsic, Lendhurst, Ohio

[73] Assignee: MTD Products Inc, Cleveland, Ohio

[21] Appl. No.: 09/235,574

[22] Filed: Jan. 22, 1999

[51] Int. Cl.[7] ............................................. F16D 11/00
[52] U.S. Cl. ........................ 192/108; 192/69.6; 403/348
[58] Field of Search ................................ 192/69.6, 69.61, 192/69.62, 108, 53.5, 53.51; 403/348, 350

[56] References Cited

U.S. PATENT DOCUMENTS

| Re. 32,202 | 7/1986 | Cody et al. . | |
|---|---|---|---|
| 226,453 | 4/1880 | Kelly | 403/348 X |
| 2,873,131 | 2/1959 | Metrailer | 403/348 |
| 4,019,586 | 4/1977 | Hauser | 192/69.62 X |
| 4,122,652 | 10/1978 | Holtermann . | |
| 4,221,108 | 9/1980 | Owens . | |
| 4,271,658 | 6/1981 | Foster . | |
| 4,306,405 | 12/1981 | Fleigle . | |
| 4,372,433 | 2/1983 | Mitchell et al. . | |
| 4,433,764 | 2/1984 | Goscenski, Jr. . | |
| 4,570,766 | 2/1986 | Golobay . | |
| 4,811,826 | 3/1989 | Kittel et al. | 403/348 X |
| 4,838,011 | 6/1989 | Bramstedt et al. . | |
| 5,000,302 | 3/1991 | Takeshita . | |
| 5,560,280 | 10/1996 | Rumsey | 403/348 X |
| 5,560,461 | 10/1996 | Loeffler . | |
| 5,607,037 | 3/1997 | Yarnell et al. . | |
| 5,839,556 | 11/1998 | Crawford et al. | 192/48.91 |

*Primary Examiner*—Richard M. Lorence
*Attorney, Agent, or Firm*—Roger D. Emerson; Emerson & Associates; Daniel A. Thomson

[57] ABSTRACT

A clutch retaining device for use in a clutch collar and clutch assembly. The clutch retaining device includes multiple cover clips which extend downwardly from the cover and have a substantial L-shape. The clutch collar has corresponding cover clip notches which correspond to the cover clips of the clutch collar cover. The clutch collar assembly includes a first and second clutch collar cover. The entire assembly includes a series of drive springs and drive pins which are compressed in place by the first and second clutch collar covers. A method for assembling the clutch collar assembly is also included. The method includes the steps of inserting drive pins into drive springs into drive pin receptors, aligning cover clips of a clutch cover with cover clip notches on a clutch collar, and connecting the clutch cover to the clutch collar and thereby depressing the drive pins and the drive springs.

12 Claims, 7 Drawing Sheets

CLUTCH RETAINING DEVICE

BACKGROUND OF THE INVENTION

I. Field of the Invention

This invention pertains to the art of methods and apparatus for clutches, and more particularly to methods and apparatuses for clutch collars, and even more particularly to methods and apparatuses for clutch collar covers.

II. Description of the Related Art

It is well known to provide clutches with a clutch collar mechanism, and to provide the clutch collar with a cover. The clutch collar cover maintains the drive pins in a disengaged position until needed. A known problem in the art relates to the assembly of the clutch collar cover. In the past, the covers have been fixedly attached to the clutch collar, usually by means of screws or bolts. It is desirable to provide a cover that simply clips on to the clutch collar for ease of production and assembly.

U.S. Pat. No. 5,560,461 to Loeffler discloses a transmission gear synchronizing apparatus including an internally splined, annular shiftable clutch collar mounted for co-axial movement with the drive shaft. The clutch collar in the Loeffler patent does not include a clutch collar cover. U.S. Pat. No. 5,607,037 to Yarnell et al discloses a transmission gear synchronizer apparatus including an annular shiftable clutch collar positioned between two friction races. The clutch collar is mounted for co-axial movement with respect to the friction races to enable engagement of the clutch collar with transmission gears. However, the clutch collar in the Yarnell patent does not include drive pins or a clutch collar cover.

One other known type of clutch retaining device is disclosed in U.S. Pat. No. 4,306,405 to Fleigler. Fleigler discloses biasing springs that are seated in recesses and held in by a lower wall of a shell. However, this shell, which acts as a clutch collar cover, is screwed or bolted in place.

Another known type of clutch retaining device is described in U.S. Pat. No. 4,838,011 to Bramstedt et al. Bramstedt et al disclose a series of annular rings and annular flanges that act as the clutch collar cover. However, as in the previous patent, the flange is secured to the outer face of a sheave by a series of bolts.

What is needed is a clutch collar cover that retains the drive pins in a disengaged position without having to be screwed or bolted in place. The removal of the screws and bolts from the process allows an easier production and assembly process. The difficulties inherent in the art are therefore overcome in a way that is simple and efficient while providing better and more advantageous overall results.

SUMMARY OF THE INVENTION

In accordance with one aspect of the present invention, a new and improved clutch retaining device includes a substantially flat base plate, the base plate containing two openings for receiving drive pins, and at least two cover clips.

In accordance with another aspect of the present invention, the clutch retaining device has a clutch cover, which includes multiple cover clips, which extend downwardly from the cover.

In accordance with yet another aspect of the current invention, the clutch retaining device includes the cover clips having an angle between the first and second cover clips, and the third and fourth cover clips, of less than 90°. And more preferably, the angle between the first and second clips, and the third and fourth clips, is 60°.

According to still another aspect of the current invention, the clutch retaining device has a clutch collar with multiple drive pin receptors, a top surface, a bottom surface, and multiple cover clip notches. The cover clip notches on the top surface are 90° out of alignment with respect to the cover clip notches on the bottom surface.

One advantage of the present invention is that the clutch cover holds the drive pins in place when disengaged.

Another advantage of the current invention is that the clutch cover is clipped into place on the clutch collar without the use of screws or bolts.

A further advantage of the current invention is that the cover clips are not aligned at right angles to each other, so that when the clutch cover is placed on the clutch collar, and rotated, the clutch cover remains securely attached to the clutch collar.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
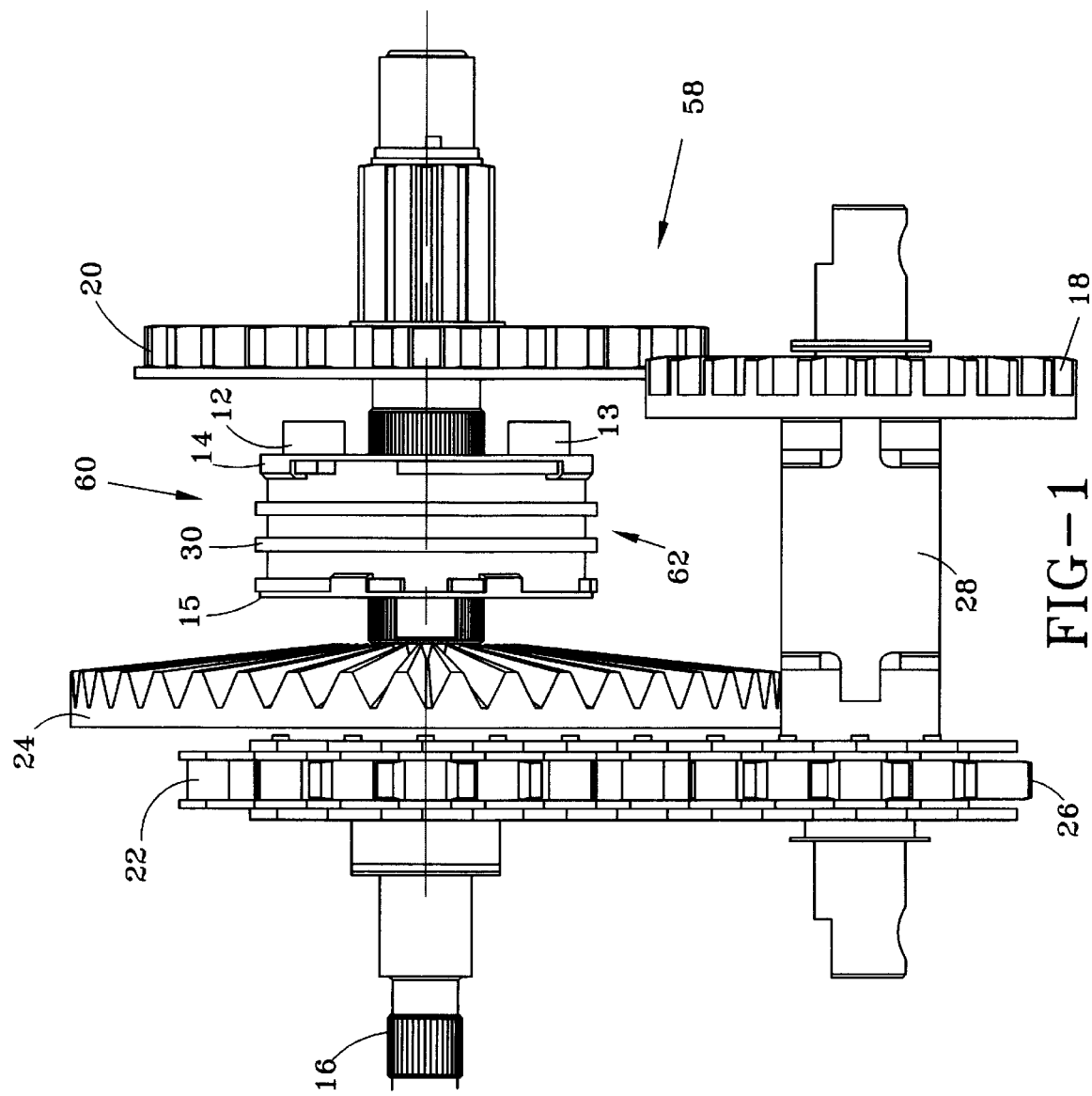
FIG. 1 is a top view of the clutch assembly, showing the clutch collar in place between the first and second spur gears and the bevel gear.

Referring now to the drawings, which are for purposes of illustrating a preferred embodiment of the invention only, and not for purposes of limiting the same, FIG. 1 shows an inventive clutch collar assembly 60 as it is used in a clutch assembly 58. FIG. 1 shows the clutch collar assembly 60 in place between a first spur gear 18, a second spur gear 20, and a bevel gear 24. FIG. 1 also shows an endless chain 22, a sprocket 26, a crank shaft coupling 28, and a drive shaft 16. The assembly and operation of the clutch assembly 58 is well known in the art and will not be described herein.

Figure 3:
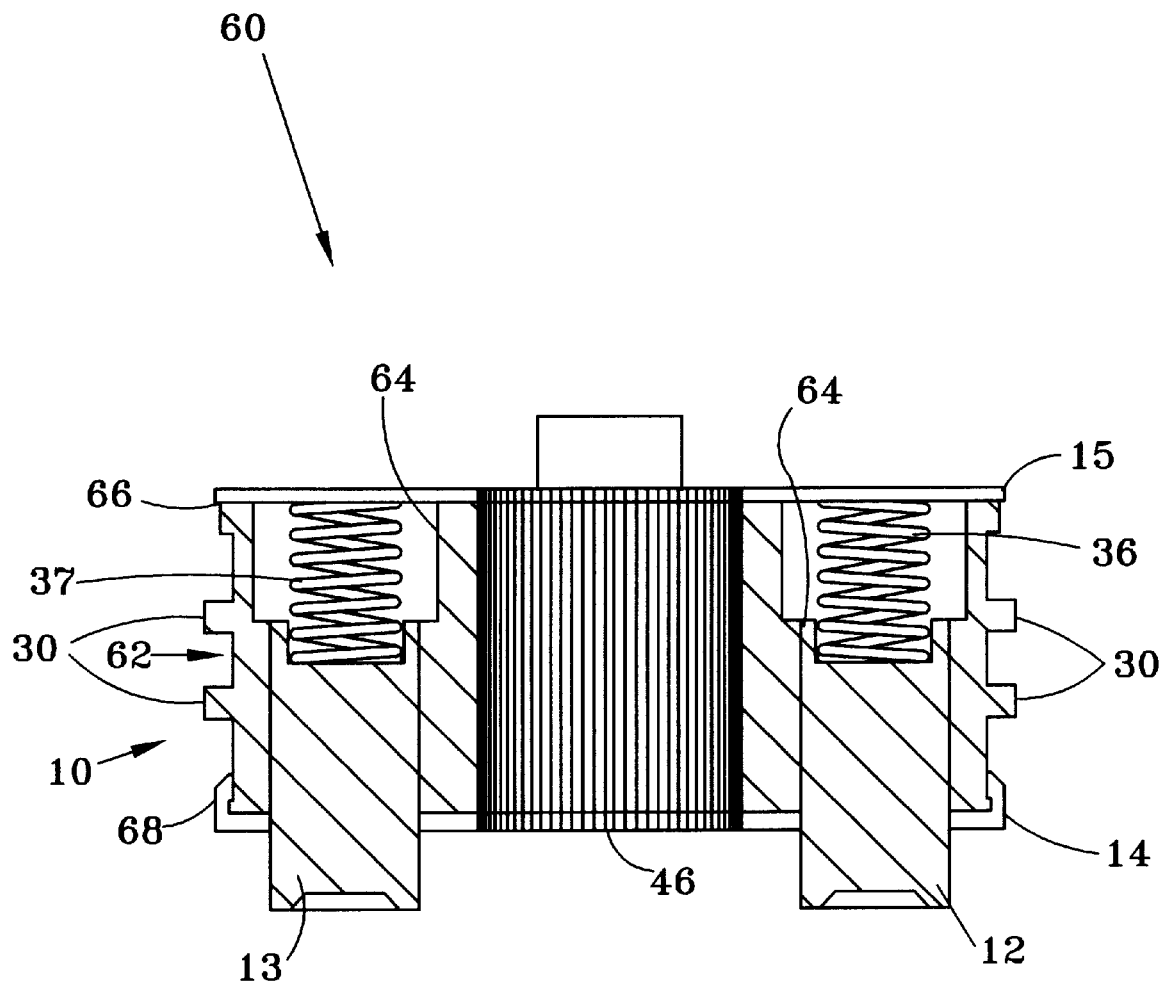
FIG. 3 is a cross-sectional view of the clutch collar assembly, showing the clutch collar, the first and second drive pins, the first and second drive springs, the first and second clutch collar covers, and the splines.
Figure 4:
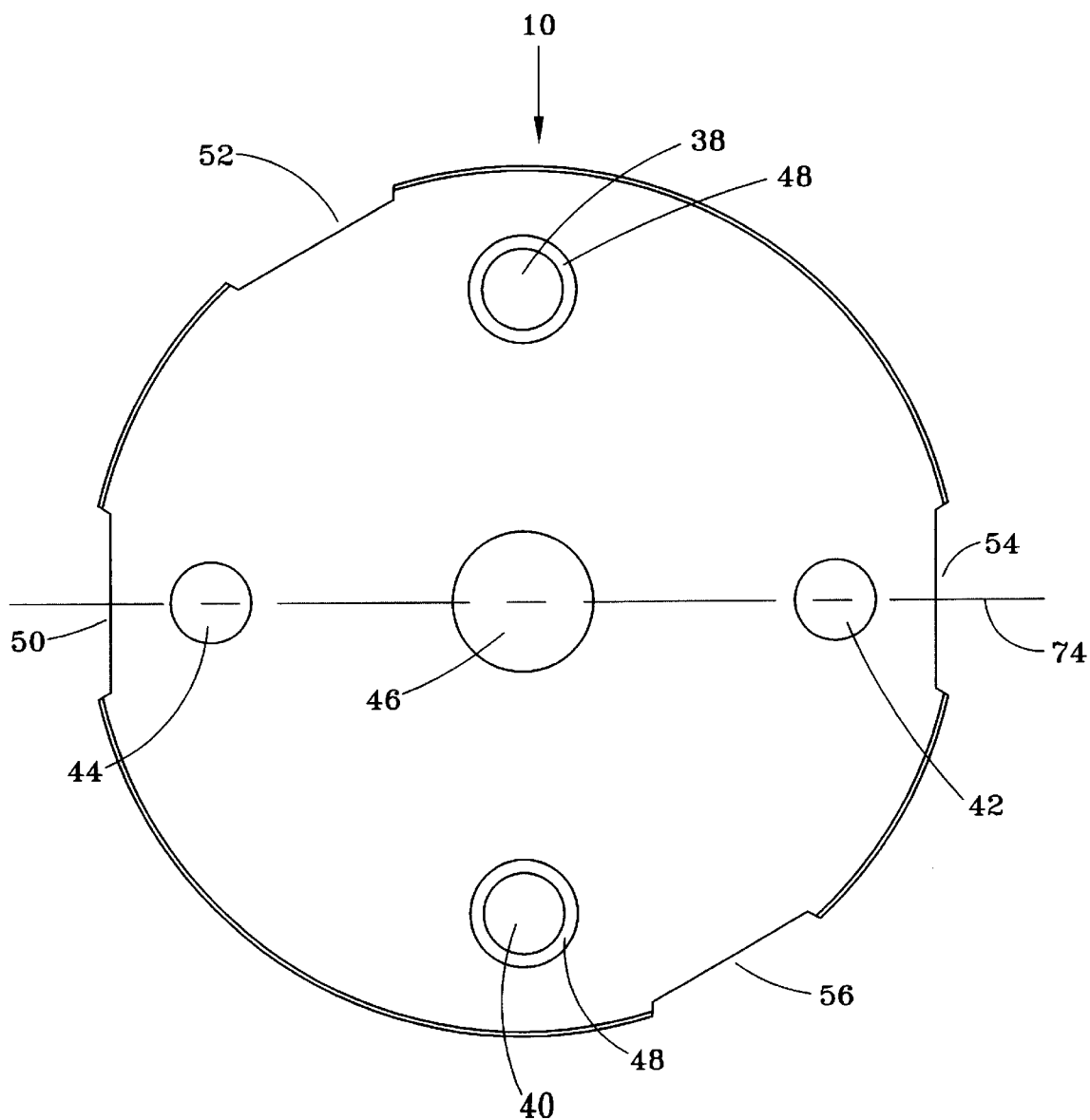
FIG. 4 is a top view of the clutch collar, showing the first, second, third, fourth, and fifth drive pin receptors, the first, second, third, and fourth cover clip notches, and the counterbores.
Figure 5:
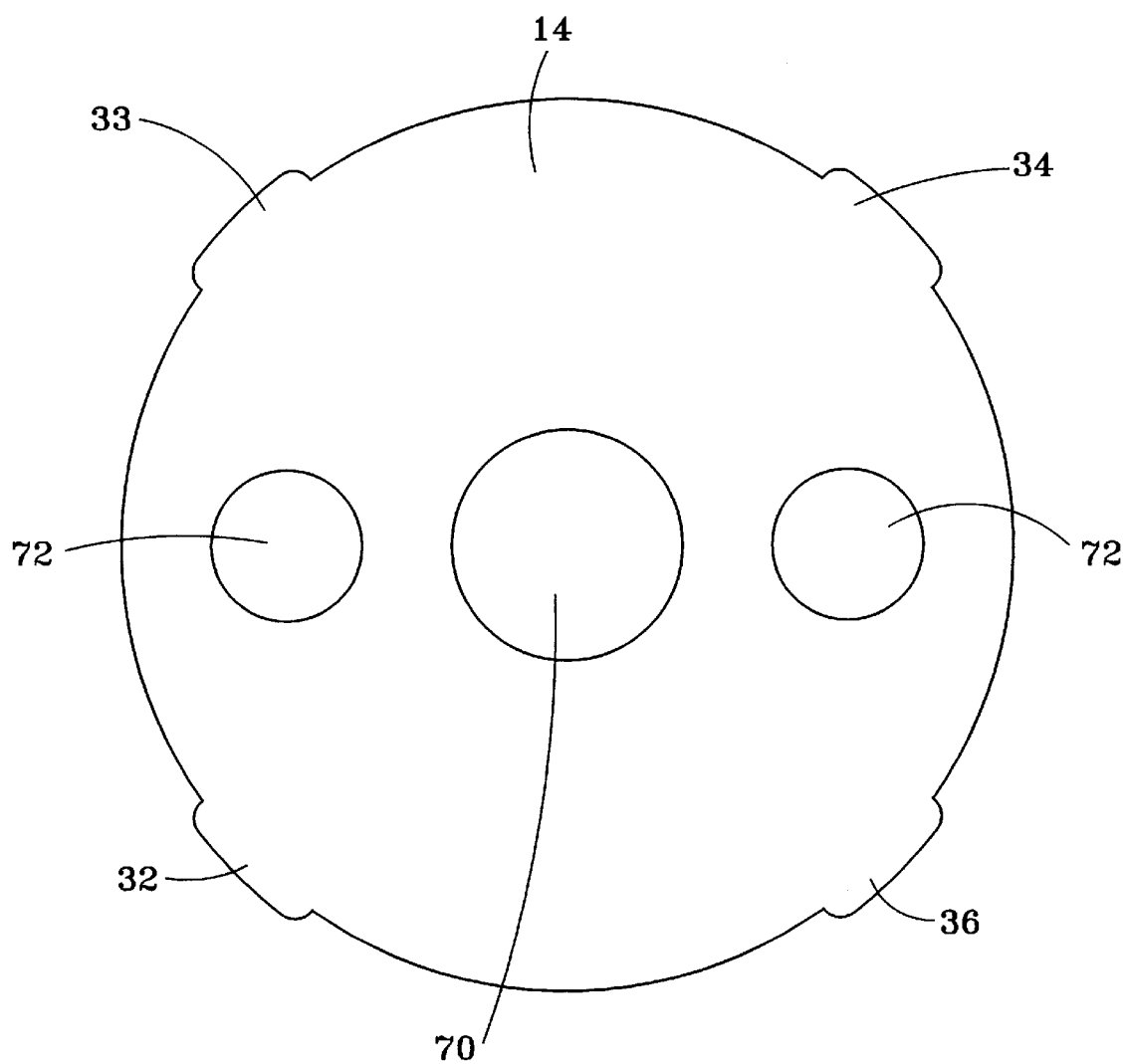
FIG. 5 is a top view of the first clutch collar cover, showing the first, second, third, and fourth cover clips.

With reference now to FIGS. 3–5, the clutch collar assembly 60 includes a clutch collar 10 and a pair of clutch collar covers 14, 15. It should be noted that only one clutch collar cover is required with this invention. The clutch collar 10 can be of any type commonly known in the art. The clutch collar 10 shown has a shaft opening 46 that is preferably splined for operatively receiving a shaft such as drive shaft 16. At least two annular projections 30 provide an annular groove 62 that operatively receives a shift fork (not shown). As is commonly known, the clutch collar 10 can be selectively moved along the axis of the drive shaft 16 by the shift fork (or other means) for operative engagement with other components.

Figure 6:
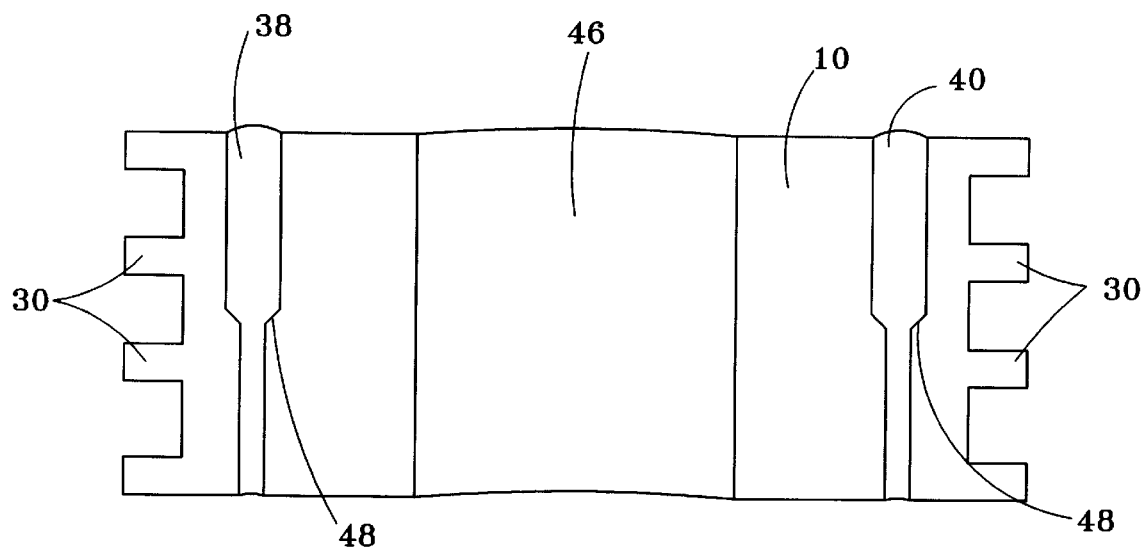
FIG. 6 is a cross-sectional view of the clutch collar, showing the first, second, and fifth drive pin receptors, the counterbores, and the splines; and, FIG. 7 is side view of the first clutch collar cover, showing the first, second, third, and fourth cover clips.

With reference to FIGS. 2–6, the clutch collar 10 has at least one but preferably multiple pin receptors (four shown and referenced 38, 40, 42 and 44) that each receive a drive pin (two shown and referenced 12 and 13) and a drive spring (two shown and referenced 36, 37). As is commonly known in the art, each drive spring 36, 37 maintains a biasing force upon each drive pin 12, 13 so that the drive pins 12, 13 can be selectively inserted within holes (not shown) of an associated gear. In this way, the clutch collar 10 is connectable to an associated gear such as second spur gear 20. The connectability of a clutch collar to a gear is well known in the art and thus will not be discussed in further detail. As best seen in FIG. 6, each pin receptor preferably has at least two counterbores forming a shoulder 48 within each pin receptor. Each drive pin 12, 13 has a generally cylindrical shape with an annular extension 64 at one end. Each drive pin 12, 13 is inserted within the corresponding pin receptor's larger bore first. In this way, as shown in FIG. 3, the annular extension 64 contacts the shoulder 48 and is thereby prevented from extending any farther into the smaller bore of the pin receptor.

Figure 2:
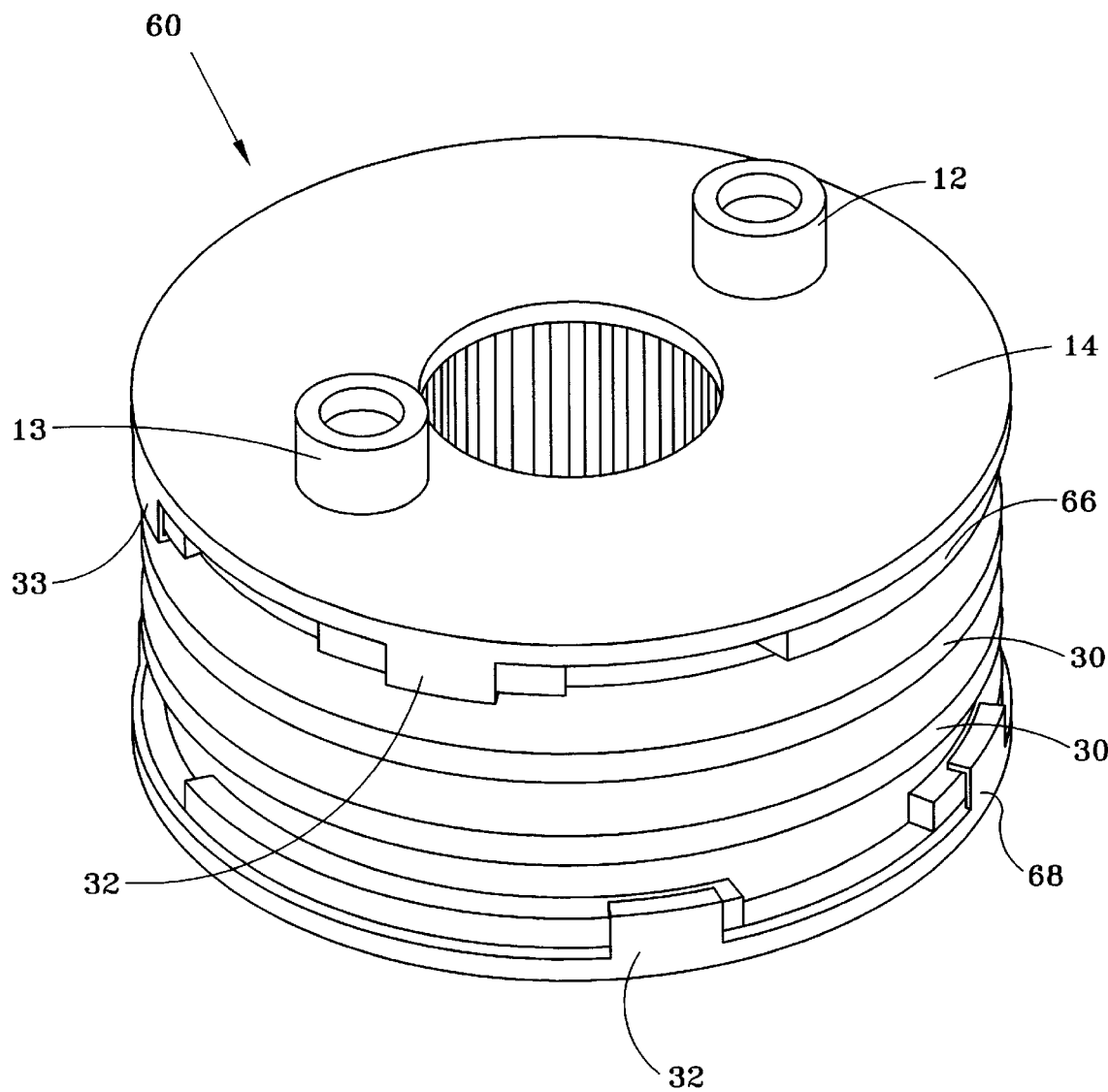
FIG. 2 is a perspective view of the clutch collar assembly, showing the clutch collar, the first clutch collar cover, the splines, the first and second drive pins, and the first and second cover clips.

With reference now to FIGS. 2–4, the clutch collar 10 has first and second ends 66, 68. Each end 66, 68 has at least one but preferably multiple cover clip notches (four shown and referenced 50, 52, 54 and 56) for receiving later to be described cover clips from the clutch collar covers 14, 15. It should be noted that the clip notches 50, 52, 54, 56 are only required on an end of a clutch collar 10 when a clutch collar cover 14, 15 will be connected thereon. When the clip notches 50, 52, 54, 56 are provided on both ends 66, 68, as in the embodiment shown, the notches 50, 52, 54, 56 on one end are preferably offset from the notches on the other end. By offset it is meant that if one were to draw a perpendicular line (as shown by line 74 in FIG. 4) dividing the notches 50, 54 or, alternatively, notches 52, 56, the two halves of the clutch collar 10 would not be mirror images.

Figure 7:
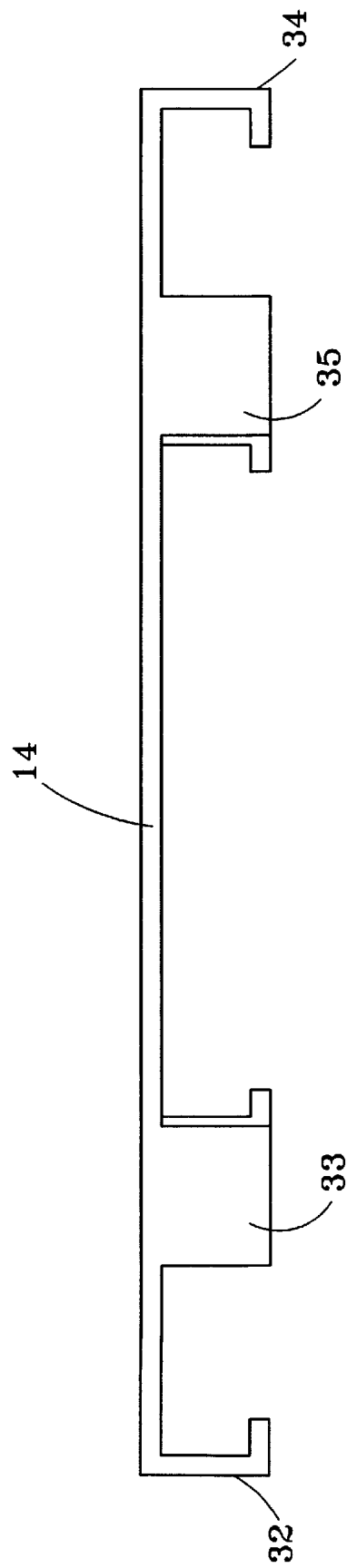

And now with particular reference to FIGS. 3, 5, and 7, the clutch collar covers 14, 15 are used, as known in the art, to keep the drive pins and drive springs within the pin receptors of the clutch collar 10. Thus, as shown in FIG. 3, the clutch collar cover 15, when connected to the first end 66 of the clutch collar 10, contacts and supports one end of the springs 36, 37. The other end of the springs 36, 37 contact and bias the drive pins 12, 13 toward the second end 68 of the clutch collar 10. As noted above, the contact of the annular extension 64 against the shoulder 48 limits the extent to which the drive pins can extend through the pin receptors. As shown, each clutch collar cover 14, 15 has a shaft opening 70 for operatively receiving a shaft such as drive shaft 16. The shaft opening 70 is coaxial with the shaft opening 46 of the clutch collar 10 when the collar cover is connected to the clutch collar 10. Each clutch collar cover 14, 15 may also have one or more pin holes 72 for receiving drive pins not being supported by the cover. This will be explained.

With reference now to FIGS. 4, 5, and 7, each clutch collar cover 14, 15 has at least one but preferably multiple cover clips (four shown and referenced 32, 33, 34 and 35) that are received by the clip notches 50, 52, 54, 56 in the clutch collar 10. In the preferred embodiment, the cover clips 32, 33, 34, 35 are substantially L-shaped and elastically deformable. By the term "elastically deformable" it is meant that the cover clips 32, 33, 34, 35 return to their original shape after being deformed. In other words, when the cover clips 32, 33, 34, 35 are "snapped" onto the clip notches 50, 52, 54, 56 of the clutch collar 10, the clips 32, 33, 34, 35 are pushed radially outward, but then return to their original position as they are received by the notches 50, 52, 54, 56. Preferably, first and second cover clips 32, 33 are aligned at an angle between 30° and 70° with respect to one another and the third and fourth cover clips 34, 35 are aligned at an angle between 30° and 70° with respect to each other. The first and fourth cover clips 32, 35 are aligned at an angle between 110° and 150° with respect to one another. Also, the second and third cover clips 33, 34 are aligned at an angle between 110° and 150° with respect to one another. Most preferably, first and second cover clips 32, 33 are aligned at a 60° angle with respect to one another and the third and fourth cover clips 34, 35 are aligned at a 60° angle with respect to each other. The first and fourth cover clips 32, 35 are aligned at a 120° angle with respect to one another. Also, the second and third cover clips 33, 34 are aligned at a 120° angle with respect to one another. The angles of the cover clips 32, 33, 34, 35 allow for the retention of the clutch cover 14, 15 on the clutch collar 10. The angles are chosen so that when the clutch cover 14, 15 is rotated 90°, the cover 14, 15 remains attached to the clutch collar 10.

Now with reference to FIGS. 2–6, the assembly of the clutch collar assembly 60 will now be described. First, the drive pin(s) 12, 13 is inserted into the larger bore of the appropriate pin receptor from the first end 66 of the clutch collar 10. The corresponding drive spring(s) 36, 37 is then inserted into the same pin receptor. Next, the appropriate clutch collar cover 15 is placed over the first end 66 and is pressed against the drive spring(s) 36, 37 with the cover clips 32, 33, 34, 35 aligned with the cover clip notches 50, 52, 54, 56 on the clutch collar 10. Once the cover 15 is snapped into place over the first end 66, the cover 15 is then rotated relative to the clutch collar 10 such that the clips 32, 33, 34, 35 are no longer aligned with the notches 50, 52, 54, 56. This secures the connection of the cover 15 to the first end 66 of the clutch collar 10. When drive pins 12, 13 will be used from both ends 66, 68 of the clutch collar 10, the cover 15 must be rotated such that the pin holes 72 in the cover 15 are aligned with the remaining (at this point empty) pin receptors.

With continuing reference to FIGS. 2–6, to add additional drive pins from the opposite end 68 of the clutch collar 10, the drive pin(s) is inserted into the larger bore of the appropriate pin receptor from the second end 68 of the clutch collar 10. The corresponding drive spring(s) is then inserted into the same pin receptor. Next, the appropriate clutch collar cover 14 is placed over the second end 68 and is pressed against the drive spring(s) with the cover clips aligned with the cover clip notches on the clutch collar 10. In the preferred embodiment, once the cover 14 is on the clutch collar 10, the L-shape of the cover clips fits around an annular extension 30 that forms either of the ends 66, 68. Once the cover 14 is snapped into place over the second end 68, the cover 14 is then rotated 90° relative to the clutch collar 10 such that the clips are no longer aligned with the notches. This secures the connection of the cover 14 to the second end 68 of the clutch collar 10. The cover 14 can be rotated any amount so long as the cover clips are not aligned with the notches. The cover 14 must be rotated such that the pin holes 72 in the cover 14 are aligned with and receive the drive pins previously assembled and now extending from the second end 68 of the clutch collar 10.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

what is claimed is:

1. A clutch collar assembly comprising:
   first and second clutch collar covers each comprising:
      a substantially flat, circular base plate, the base plate containing three holes for receiving associated drive pins;
      a first cover clip;
      a second cover clip;
      a third cover clip; and, a fourth cover clip, the clips comprising:
         the clips extending at an angle from the base plate;
         the clips being L-shaped;
         the clips being elastically deformable;
         the first and second clips being at an angle between 30° and 70° with respect to one another;
         the third and fourth clips being at an angle between 30° and 70° with respect to one another;
         the first and fourth clips being at an angle between 110° and 150° with respect to one another; and,
         the second and third clips being at an angle between 110° and 150° with respect to one another;
   a clutch collar comprising:
      a first end;
      a second end;
      multiple splines;
      a first drive pin receptor;
      a second drive pin receptor;
      a third drive pin receptor;
      a fourth drive pin receptor;
      the first, second, third, and fourth drive pin receptors having a counterbore approximately half way down the receptor; and,
      multiple cover clip notches for receiving the cover clips, the cover clip notches on the first end being rotated 90° with respect to the cover clip notches on the second end.

2. A clutch collar assembly comprising:
   a drive pin adapted for use in engaging an associated component;
   a clutch collar having at least one pin receptor for receiving the drive pin, the clutch collar also having at least one clip notch; and,
   a first clutch collar cover for use in keeping the drive pin within the pin receptor, the first clutch collar cover having at least one cover clip for use in connecting the first clutch collar cover to the clutch collar, the cover clip being selectively received within the clip notch.

3. A clutch collar assembly comprising:
   a drive pin adapted for use in engaging an associated component;
   a clutch collar having at least one pin receptor for receiving the drive pin, the clutch collar also having at least one clip notch;
   a first clutch collar cover for use in keeping the drive pin within the pin receptor, the first clutch collar cover having at least one cover clip for use in connecting the first clutch collar cover to the clutch collar, the cover clip being selectively received within the clip notch; and,
   the at least one cover clip is elastically deformable.

4. The clutch collar assembly of claim 3, wherein the clutch collar assembly further comprises:
   a first cover clip;
   a second cover clip;
   a third cover clip; and,
   a fourth cover clip.

5. The clutch collar assembly of claim 4, wherein the cover clips are not equally spaced on the clutch collar cover.

6. The clutch collar assembly of claim 5, wherein the angle between the first and second cover clips is less than 90°;
   the angle between the third and fourth cover clips is less than 90°;
   the angle between the first and fourth cover clips is greater then 90°; and,
   the angle between the second and third cover clips is greater than 90°.

7. The clutch collar assembly of claim 6, wherein the angle between the first and second clips, and the third and fourth clips, is between 30° and 70°.

8. The clutch collar assembly of claim 7, wherein the angle between the first and second cover clips, and the third and fourth cover clips, is 60°.

9. The clutch collar assembly of claim 2, wherein the at least one cover clip is substantially L-shaped.

10. The clutch collar assembly of claim 2, wherein the at least one cover clip notch on the first end is rotated 90° with respect to the at least one notch on the second end.

11. The clutch collar assembly of claim 10, wherein the at least one drive pin receptor further comprises:
    counterbores approximately half way down the receptor.

12. The clutch collar assembly of claim 2, wherein the cover clips extend at an angle from the clutch collar cover and are substantially L-shaped.

* * * * *